United States Patent [19]

Green

[11] 4,059,137

[45] Nov. 22, 1977

[54] TIRE-CHAIN DEVICE

[76] Inventor: Edmund T. Green, Golfview Drive - Box 69 - 1B, Hadley, N.Y. 12835

[21] Appl. No.: 599,501

[22] Filed: July 28, 1975

[51] Int. Cl.$^2$ .......................................... B60C/27/02
[52] U.S. Cl. .................................................. 152/232
[58] Field of Search ............... 152/221, 232, 233, 179, 152/182, 187, 191; 305/19

[56] References Cited

U.S. PATENT DOCUMENTS

| 847,442 | 3/1907 | Shepard | 152/182 |
|---|---|---|---|
| 1,223,724 | 4/1917 | Otto | 152/233 X |
| 1,288,009 | 12/1918 | Ihnken | 152/233 |
| 1,336,663 | 4/1920 | Story | 152/191 |
| 1,399,553 | 12/1921 | Hamill | 152/191 |
| 1,764,785 | 6/1930 | Frykman | 152/232 X |
| 2,898,967 | 8/1959 | D'Domenico | 152/233 |

Primary Examiner—Robert B. Reeves
Assistant Examiner—Francis J. Bartuska
Attorney, Agent, or Firm—Allison C. Collard

[57] ABSTRACT

A combination tire-chain device comprising a tire having a crown with a plurality of openings extending parallel to the axis of the tire and uniformly spaced around the tire extending through the crown from one side thereof to another side wall thereof. A plurality of bolts, each having a length larger than each of the openings and complementary in cross-section to that of the openings, and threaded at one free end and having a bolt head at the other end. A chain is connected to the other end adjacent to the bolt head and is adapted to be placed over the outer periphery of the tire when the bolt is inserted in the opening. A connecting member having a bolt opening substantially complementary to the one free end of the bolt is connected to a free end of the chain. A locking bolt releasably threadably engages the threaded free end of the bolt and secures the bolt, as well as the connecting member against the side wall of the tire.

1 Claim, 3 Drawing Figures

TIRE-CHAIN DEVICE

The present invention relates to tire chains for vehicles for winter use.

Tire chains are known to be placed on tires during snow and the like in order to increase the traction of the tire to the road.

To date there is no readily convenient chains which can be easily placed on and removed from tires. Only full sets of chains are known, and strapped chains which are strapped around the tire by a buckle or the like. Traction crowns and special treads are known to be secured to the surface of a tire about its circumference to improve the traction of the tire and permit replaceability when the surface wears down. These include bolts passing through the crown of the tire above the interface to hold the tread thereon as well, as rivets inserted through the side walls or eyelets (note U.S. Pat. Nos. 797,200; 2,265,468 and 2,411,240). These latter structures are not designed for chains for snow and weather conditions, but are merely for increasing the tread life.

It is an object of the present invention to provide an improved chain for tires which facilitates insertion and is effective in operation.

It is another object of the present invention to provide a winter tire chain combination in which the tire is formed with at least six bores which are spaced apart around the circumference of the tire parallel to the tire axis and a bolt is passed through each of the holes. The bolt preferably includes chain lengths, one of which is permanently attached to a head end of the rod. The end of the chain has a bracket with, e.g., a ½ inch drill hole which can slide over the rod and then be locked in place by a wing nut. The chain brackets are mounted at each end so that a tire chain can be connected across the surface of the tire, transverse to its rotation. The bolt has, e.g., a hexagonal head at one end, and a nut with lock washer to be mounted at the other end so that each of the bolts could be secured to the tire, quickly and easily.

It is another object of the present invention to provide a tire chain combination which is inexpensive in cost, reliable in operation and easy to manufacture.

Other methods of securing the chain to the rod can be utilized such as a drilled hole in the rod which would accept a locking pin which would be attached to the tire chain. Advantages of the structure of the present invention is that the tire is designed to be used all year. With the present invention, there is provided one of the best snow tires ever designed. In a matter of minutes, the new tire in accordance with the present invention can be made ready for driving in snow by anyone capable of driving a car.

Tires in accordance with the present invention will be made in all sizes with a change in tire construction to accept rods and chains which can be inserted in specially designed spaced-apart openings in the tire. This quick assembly provides universal marketing appeal. The change to snow driving can be done very easily in a person's garage, or on the road, or in a snow storm without any special tools or jacking of the vehicle. The rods and chains can be simply removed by the vehicle operator when they feel they are no longer necessary. The simplicity of applying or removing the rods and chains to this year-around specially designed tire, together with the ease of manufacturing, should make this a most useful invention, and one that would be immediately accepted by the public since it will help them to help themselves even if caught in a sudden snow storm or snow conditions.

The invention is not limited to passenger cars but can be used on trucks, buses, tractors and other vehicles. The rod openings in the tire, when they are not being used for snow conditions, will have a cooling action on the tire and this should prolong the life of the tire by effecting a heat release.

Other objects and features of the present invention will become apparent from the following detailed description when taken in connection with the accompanying drawing which discloses the embodiments of the invention. It is to be understood, however, that the drawing is designed for the purpose of illustration only and is not intended as a definition of the invention.

In the drawing, wherein similar reference numerals denote similar elements throughout the several views.

Figure 1:
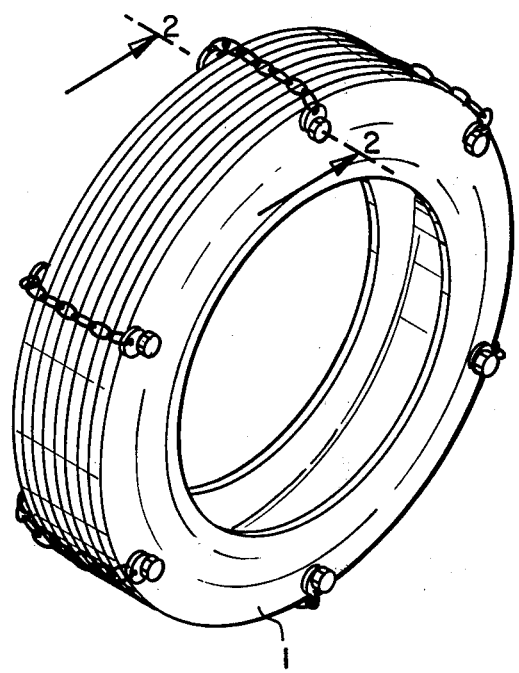
FIG. 1 is a perspective view of a tire with attached chain and bolt designed in accordance with the present invention.
Figure 2:
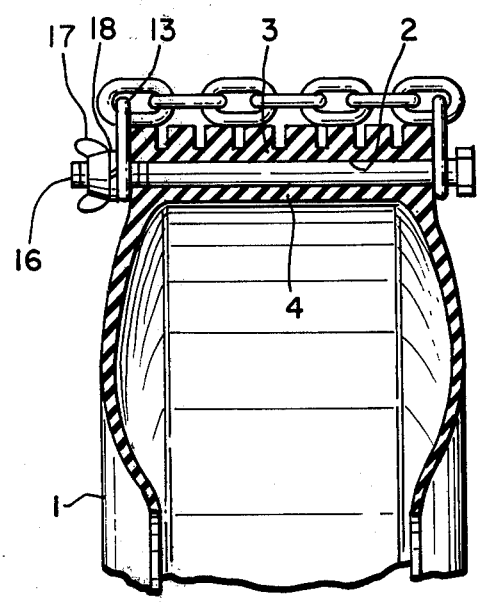
FIG. 2 is a section taken along the lines 2—2 of FIG. 1 partially broken away.
Figure 3:
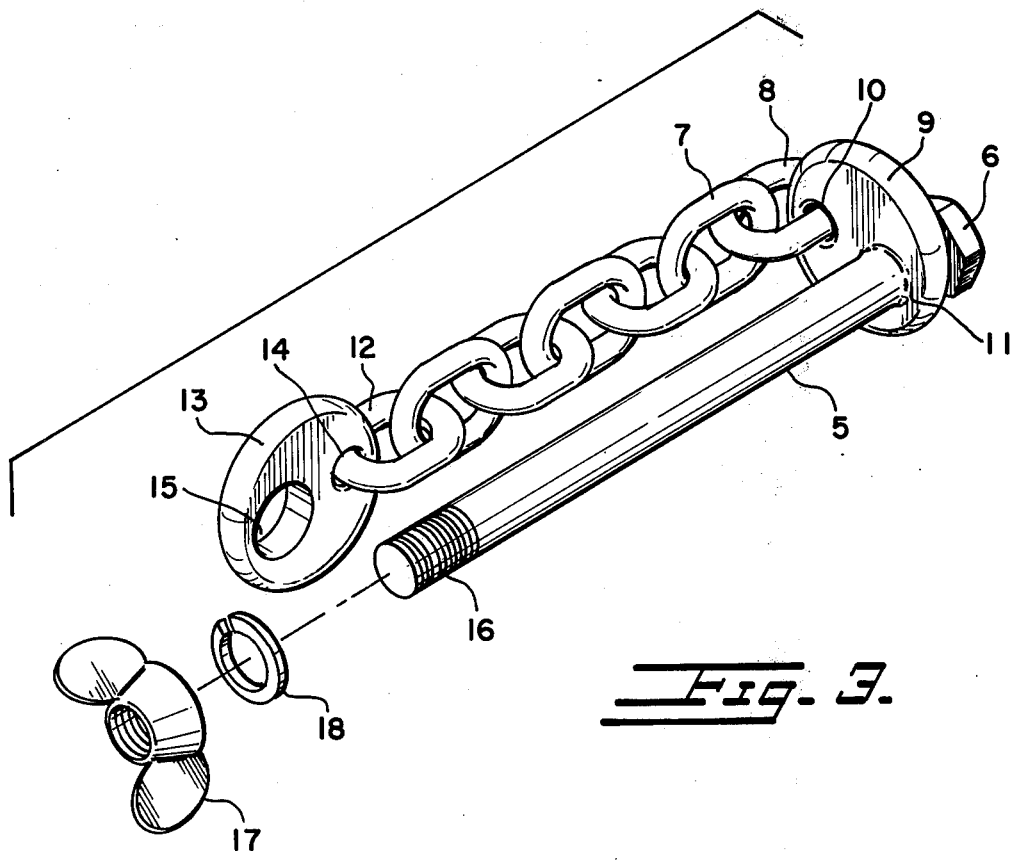
FIG. 3 is an exploded perspective view of one of the chain bolt units in accordance with the present invention.

Referring now to the drawing and more particularly to FIGS. 1-3, a tire-chain bolt combination in accordance with the present invention comprises a tire 1 formed preferably with six openings 2 in crown 3 of the tire. Openings 2 pass completely through, parallel to the longitudinal axis of the tire, and are spaced 60° apart from each other.

Preferably, the holes are ½ inch holes going through the crown core from side wall to side wall on the inside of the tire below the cores or treads. The hard core material will be strong enough to withstand the stresses, approximatey being 1 inch in thickness. The tire as shown in FIG. 2 has about a 1-inch molded core 4.

The chain bolt combination comprises, as shown in FIG. 3, a bolt 5 which preferably is ⅜ of an inch in diameter and has a hex end 6 at one end. The tire chain 7 is permanently attached by one end link 8 to a disc 9, having an offset opening 10 near one end. Disc 9 has an opening 11 near its other end through which the bolt passes, and is fixed thereto adjacent the hexagonal end 6. The other end of the chain at end link 12 is attached to another disc member 13 likewise having two offset holes 14 and 15, the smaller of which is permanently secured to the link 12. Its larger opening 15 is adapted to slide over the diameter of rod 5 for connection as will hereinafter be explained. At the free end of rod 5 is an end 16 which is theaded to accept a threaded wing nut 17 having a permanent lock washer 18.

In operation, when it is desired to use the individual six chains, they are simply taken out and bolt 5 is inserted through openings 2. The chain and end disc member 13 is passed over the outer circumference, peripheral thread of the tire, and opening 15 is placed on the threaded end 16 of the bolt. The wing nut with lock washer 18 affixed thereto is turned onto threaded end 16 for locking the chains tightly in position as shown in FIG. 2. Locking nut 17 is threaded at the inside of the tire complementary to thread 16 of the rods 5.

The chain and rod and locking wing nut are made in various lengths to fit the various widths and corresponding tire sizes. Although not limited herein and although 1-inch molded core and ⅜ inch holes for ⅜ inch chain rods are described, these dimensions are to be varied according to larger size tires as on trucks, buses, tractors and the like.

The links are alternately coupled with some links being vertical and others being horizontal as shown in position in FIG. 2. They have a length substantially equal to the operative length of rod 4 in a tight position as shown in FIG. 2.

The chain, rod and links are made of steel for heavy duty use.

While only a few embodiments of the present invention have been shown and described, it will be apparent to those skilled in the art that many changes and modifications may be made thereunto without departing from the spirit and scope of the invention.

What is claimed is:

1. A combination pneumatic tire-chain device comprising:
   a tire having a crown, including treads and a crown core below said treads, said crown core being provided with a plurality of openings extending parallel to the axis of the tire and uniformly spaced around the tire extending through the crown core from one side wall thereof to another side wall thereof;
   a plurality of bolts, each having a length larger than each of said openings and complementary in cross-secton to that of said openings and threaded at one free end, and having a hexagonal-shaped bolt head at the other end;
   a chain comprising a plurality of links, including end links, one end link of which is coupled to said other end of each of said bolts adjacent said bolt head, said chain being adapted to be placed over the outer periphery of the tire on said treads when the bolt is inserted in said opening, said chains being uniformly spaced along said treads, leaving a major portion of said treads exposed;
   a first-connecting member having a bolt opening substantially complementary to said one free end of the bolt and connected to the other end link of said chain and having a flat surface for abutting a side wall of the tire adjacent the opening;
   locking bolt means releaseably threadably engaging the threaded free end of said bolt and securing said bolt thereto and pressing said flat surface of said first connecting member against said side wall of the tire, said locking bolt means comprising a wing nut and a spring-biased annular lock washer secured to said wing nut; and
   a second-connecting member for connecting the said one end link of said chain at said bolt head of said bolt to said bolt, said second-connecting member being permanently secured to said bolt, and having a flat surface adapted to abut the other side wall of said tire when said bolt means secures said bolt, said first and second-connecting members constituting discs, each having a chain opening receiving end links of said chain, said chain openings of said first- and second-connecting members and said bolt opening of said first-connecting member being radially offset relative to the center of the respective disc, with the bolt opening of said first-connecting member being larger than said chain openings.

* * * * *